United States Patent [19]

Gouch et al.

[11] Patent Number: 5,682,443
[45] Date of Patent: Oct. 28, 1997

[54] IMAGE COLOR MODIFICATION METHOD AND APPARATUS EMPLOYING UNSHARP MASKING

[75] Inventors: Martin P. Gouch; Lindsay W. MacDonald, both of Hertfordshire, England

[73] Assignee: Crosfield Electronics Limited, Hertfordshire, England

[21] Appl. No.: 210,433

[22] Filed: Mar. 21, 1994

[30] Foreign Application Priority Data

Mar. 24, 1993 [GB] United Kingdom ............... 9306083
Apr. 28, 1993 [GB] United Kingdom ............... 9308794

[51] Int. Cl.$^6$ ............... H04N 1/46; G03F 3/08
[52] U.S. Cl. ............... 382/254; 358/531; 358/517; 358/518
[58] Field of Search ............... 358/532, 530, 358/531, 443, 445, 446, 447, 448, 517, 518; 382/54, 162, 167, 254, 266, 264

[56] References Cited

U.S. PATENT DOCUMENTS

| | | | |
|---|---|---|---|
| 2,962,548 | 11/1960 | Taudt. | |
| 4,054,916 | 10/1977 | Knop | 358/284 |
| 4,315,318 | 2/1982 | Kato et al. | 358/447 |
| 4,319,268 | 3/1982 | Yamada | 358/75 |
| 4,346,409 | 8/1982 | Ishida et al. | 358/458 |
| 4,724,477 | 2/1988 | Ellis et al. | 358/532 |
| 4,817,180 | 3/1989 | Cho et al. | 382/264 |
| 4,954,912 | 9/1990 | MacDonald et al. | 358/530 |
| 5,081,692 | 1/1992 | Kwon et al. | 358/447 |
| 5,485,534 | 1/1996 | Takemoto et al. | 382/266 |

FOREIGN PATENT DOCUMENTS 0171954 2/1986 European Pat. Off..

*Primary Examiner*—Edward L. Coles, Sr.
*Assistant Examiner*—Kimberly A. Williams
*Attorney, Agent, or Firm*—Sughrue, Mion, Zinn, Macpeak & Seas, PLLC

[57] ABSTRACT

A method and apparatus for modifying an image defined by data representing the colour component content of each pixel of the image. The method comprises, for each colour component of each pixel, (a) generating unsharp (U) and sharp (S) data and performing an unsharp masking algorithm on the sharp and unsharp data to generate fringe data (F);

(b) modifying the fringe data with a weighting function ($\phi$) determined in accordance with the values of the sharp or unsharp data for all of the colour components of the pixel; and (c) combining the modified fringe data with the pixel data to generate modified pixel data.

By applying a weighting function related to all the unsharp values for the pixel and hence to the input colour component content of the input signals of a particular sample area, the fringe amplitude is varied according to the colour of the region thereby enabling sharpening or smoothing to be appropriate to the part of the image e.g. sharpening hair and smoothing skin colours.

10 Claims, 5 Drawing Sheets

Fig. 8a.
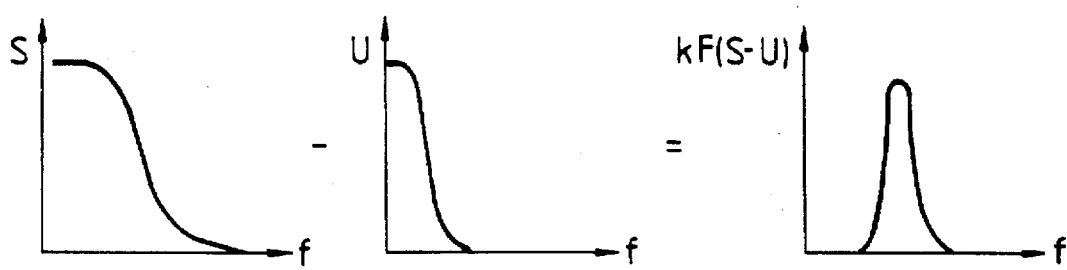
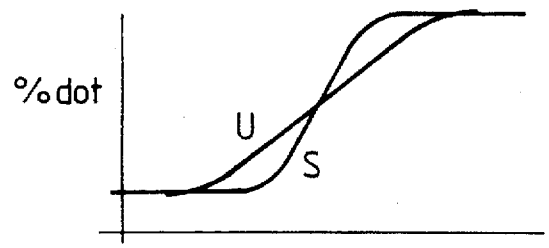
Fig. 8b.
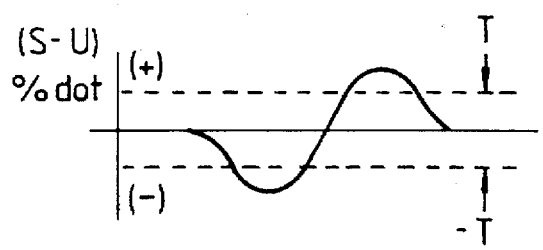
Fig. 8c.
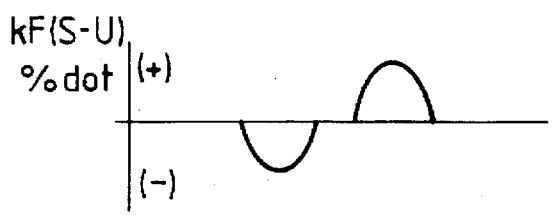
Fig. 8d.
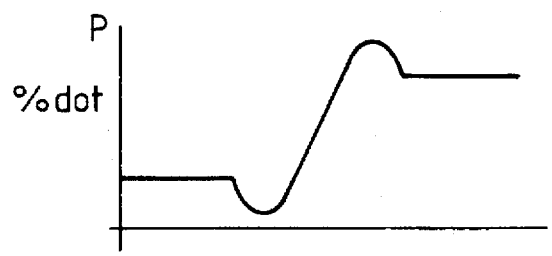
Fig. 8e.

IMAGE COLOR MODIFICATION METHOD AND APPARATUS EMPLOYING UNSHARP MASKING

FIELD OF THE INVENTION

This invention relates to a method of modifying a colour image.

DESCRIPTION OF THE PRIOR ART

It is normal in the processing of an image or graphic arts reproduction to sharpen edges and enhance fine detail by means of unsharp masking (USM). Typically this is performed by a convolution process, passing a filter window across the image to take a weighted average of the surrounding pixels at each position, then generating some function of the so-called 'sharp' (original value of central pixel) and 'unsharp' (weighted average of neighbours) signals.

FIG. 7 shows the relationship between the regions covered by the sharp and unsharp signals. The sharp signal in this instance is the value of the single pixel 70 at the current processing location. The unsharp signal is a weighted average of the 25 pixels in a 5 by 5 pixel region 71 centred on the same location. The weighting function may be a simple average of all pixels, i.e. equal contribution from all elements, or may give greater contribution to the pixels nearer the centre. The regions sizes used in deriving both sharp and unsharp signals may be either smaller or larger. The technique of convolution is well known in digital image processing applications, see for example the text "Digital Image Processing" (Second Edition) by R. C. Gonzalez and P. Wintz, published in 1987 by Addison-Wesley, pp. 161-183.

The principle of unsharp masking is to emphasise high-frequency fringe information in the image as illustrated in FIG. 8a. A function of the difference between the original sharp (local) signal S and the low frequency unsharp (neighbourhood average) signal U is calculated. FIG. 8a shows graphs of frequency (f) against number of pixels for sharp (S) data, unsharp (U) data and the function kF(S-U) which gives the high frequency fringe data.

FIGS. 8b–8e show the successive stages for addition of a thresholded difference signal (sharp minus unsharp) to the original sharp signal. FIG. 8b shows the original sharp pixel signal S and the low-pass filtered unsharp signal U. The difference (S-U) is shown in FIG. 8C, which also shows the threshold values (T,-T). The thresholded fringe signal is shown in FIG. 8d and the final, enhanced output signal P is shown in FIG. 8e, in which the fringe signal has been combined with the original signal. Typical equations for the process are:

$$P = S + K.f(S-U)$$

where

S=sharp signal (local value)
U=unsharp signal (neighbourhood average)
f()=suitable fringe generation function
K=weighting factor for degree of USM applied
P=output signal (enhanced)

The process of unsharp masking in image scanners for the graphic arts is described in detail in "Electronic Color Separation" by R. K. Molla published in 1988 by R. E. Printing of Charleston W.V., pp. 225-240.

Such a method may be applied on the fly in a graphic arts scanner as the image is being scanned, or as a post-scan processing operation by the computer on the stored digital image.

The purpose of unsharp masking is to increase the apparent sharpness of boundaries in the image. In electronic image reproduction unsharp masking is achieved by deriving from the picture signals sharp and unsharp signals equivalent to viewing a small area, and a large area incorporating the small area of the image, respectively. These signals are then combined in a predetermined manner so that the contrast on either side of the boundary is increased. Thus, at a boundary between light and dark areas, the light area adjacent the boundary is made lighter and the dark area adjacent the boundary is made darker. This gives the visual effect of increased sharpness.

Another customary and necessary processing operation carried out on an image is to apply colour correction to compensate for differences in colour gamut between original photographic dyes and printing inks, deficiencies in the original such as casts due to lighting, wrong exposure or film processing error and editorial colour adjustment. Typically, colour correction is performed by a look-up table (LUT) operation in which the table is loaded by a colour correction function that is the composite of all the factors.

It has been shown that an improved image results from parallel, rather than serial operation of USM and colour correction. See European Patent Publication EP-A-0171954. In a typical graphic arts scanner, the incoming digital signals derived from the light transmitted through the red, green and blue filters of the image sensing means are converted into sharp colour corrected signals for the four printing inks cyan, magenta, yellow and black.

However, the problem with this method is that the sharpening of edges and fine detail is applied to all colour separations. Although the function f(S,U) may be sensitive to contrast differences between the S and U signals, where S is a sharp signal and U an unsharp signal, typically by reducing small differences and amplifying large differences, the resultant fringe signal f(S,U) is independent of the actual colour of the image. This can result in the enhancement of both the wanted edge detail and unwanted noise and grain detail present in the original film.

Another common operational requirement is to be able to enhance or sharpen some regions of an image whilst simultaneously smoothing others. A very common example is in the reproduction of portrait photographs where the hair and eyelashes are made as sharp as possible, whilst the skin is to be made smooth to disguise blemishes. Typically, this operation must be performed as a subsequent image retouch operation with the use of one or more spatial masks to discriminate between the areas to be sharpened and smoothed and cannot be included in the scanning process.

A further conventional image enhancement technique is described in U.S. Pat. No. 2,962,548.

SUMMARY OF THE INVENTION

In accordance with one aspect of the present invention, we provide a method of modifying an image defined by data representing the colour component content of each pixel of the image. The method involves for each colour component of each pixel, (a) generating unsharp and sharp data and performing an unsharp masking algorithm on said sharp and unsharp data to generate fringe data;

(b) modifying said fringe data with a weighting function determined in accordance with the values of said sharp or unsharp data for all of said colour components of said pixel; and (c) combining said modified fringe data with said pixel data to generate modified pixel data.

In accordance with a second aspect of the present invention we provide apparatus for modifying an image defined by data representing the colour component content of each pixel of the image, the apparatus comprising generating means to generate unsharp and sharp data for each colour component of each pixel; processing means to perform an unsharp masking algorithm on said unsharp and sharp data to generate fringe data, means to modify said fringe data with a predetermined weighting function in accordance with the values of said sharp or unsharp data for all of said colour components of the pixel; and means for combining said modified fringe data with said pixel data to generate modified pixel data.

By applying a weighting function related to the colour of the region containing the pixel (ie. the colour as defined by a point in 3D colour space given by the sharp or unsharp data values), the fringe amplitude (ie. degree of sharpening) is varied according to the colour of the region. This enables sharpening or smoothing to be appropriate to the part of the image e.g. sharpening hair and smoothing skin colours. By using the unsharp signal values there is greater resistance to noise in the original pixel data, but sharp signal values could also be used.

Typically the unsharp data is determined by calculating a weighted average of the pixel data in a region (such as a 5*5 pixel square) surrounding the pixel. Alternatively, the unsharp data may be calculated as some other function of the neighbourhood pixel values.

Typically, the sharp data is the same as the pixel data. However, it may be colour corrected pixel data, or some other function of the pixel data.

Preferably the degree of sharpening of the various parts of the image is determined by an operator pointing to areas of the image to be smoothed and sharpened respectively. The average colour of each area is then calculated, and the value of the weighting function for that colour is set according to the required degree of sharpening or smoothing. Alternatively the operator may select a point on the image, and the average colour of an area surrounding that point (which may or may not be the same area as the region used to calculate unsharp data values) is calculated and used to determine part of the weighting function. Alternatively, the weighting function may be set automatically according to some predetermined rule set.

Preferably, the weighting function is a mathematically continuous function in the coordinate space defined by the sharp or unsharp colour signals.

Preferably the pixel data is colour corrected before being combined with the modified fringe data. Alternatively the pixel data may not be colour corrected, or may be corrected after sharpening.

BRIEF DESCRIPTION OF THE INVENTION

An example of a method and apparatus for colour correction of an image in accordance with the present invention will now be described and contrasted with a conventional method and apparatus with reference to the accompanying drawings, in which:

FIG. 8 shows the successive stages of an unsharp masking process; and,

EMBODIMENT

Figure 1:
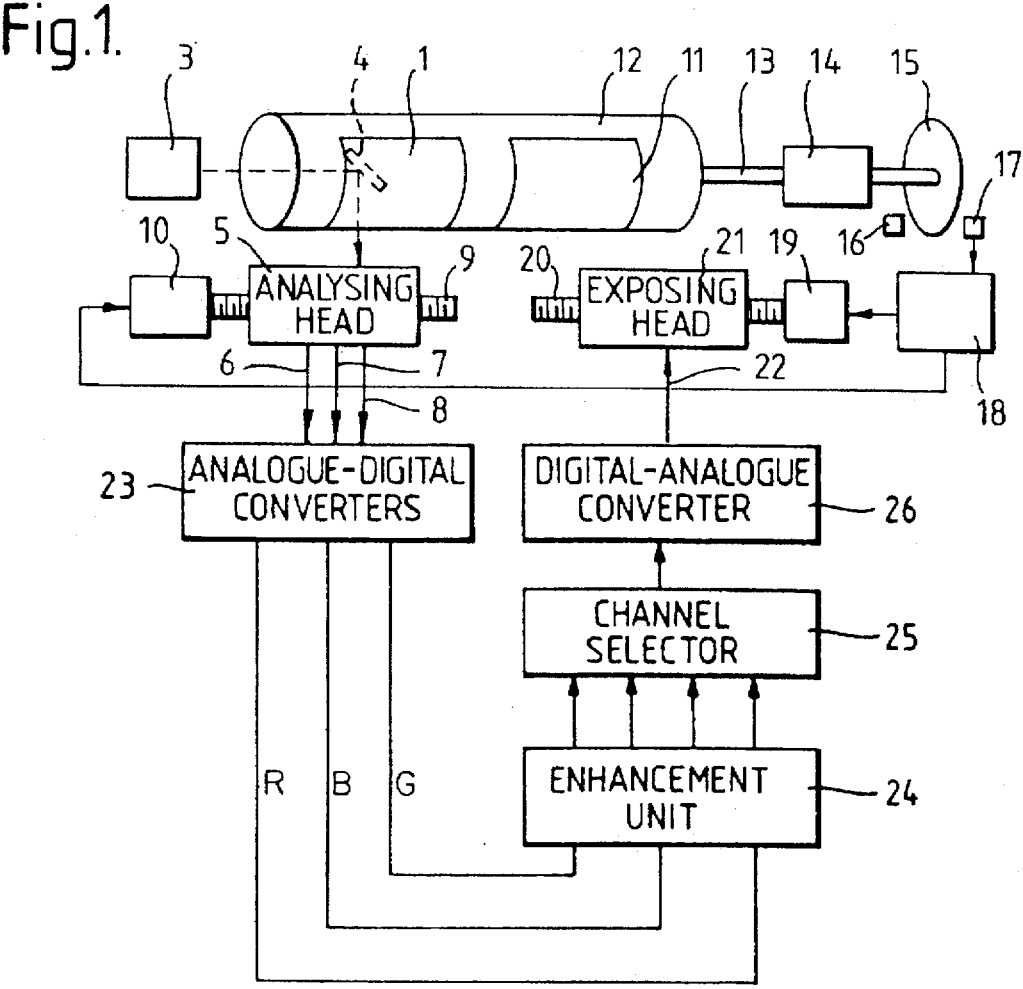
FIG. 1 illustrates diagramatically an example of image scanning apparatus.

In FIG. 1, a transparent original 1 to be reproduced is wrapped around the surface of a transparent drum 12. A xenon lamp 3 directs light rays into the drum and on to a 45° mirror 4, from which the rays pass through the wall of the drum and through the transparent original 1. These light rays reach an analysing head 5 containing colour filter and photoelectric devices such that signals representing the red, blue and green densities of the scanned element of the picture 1 are produced on lines 6,7 and 8 respectively. The analysing head 5 is mounted on a lead screw 9 which is driven in synchronism with the rotation of the drum 12 by a motor 10. As a consequence, the analysing head sees a point on the drum 12 which, as the drum rotates and the analysing head moves along its lead screw, traces out a helical path along the drum 12 and consequently traces out a number of parallel scanning lines on the original 1.

A light-sensitive sheet 11 to be exposed is mounted on the drum 12. The drum 12 is mounted on a shaft 13 driven by a motor 14. The motor also drives a slotted disc 15, the slotted periphery of which rotates between a light source 16 and a photoelectric cell 17. Pulses derived from the photoelectric cell 17 are applied to a control unit 18 which controls the rotation of the motor 10, driving the lead screw for the analysing head, and a motor 19 which drives a lead screw 20 on which is mounted an exposing head 21. The exposing head 21 includes a light source which is modulated by a signal on a line 22. This signal is derived from the input signals on lines 6,7 and 8 in the following manner.

The RGB signals on the lines 6,9 and 8 are first applied to analogue to digital converters 23, the digital outputs of which are fed to an enhancement unit 24. The enhancement unit 24 will be described in more detail below and as will be explained provides four output signals representing the converted and corrected signals for cyan, yellow and magenta, together with a black signal. A channel selector 25 receives the four signals, representing the cyan, yellow and magenta printer values and the black printer value, and selects the one which corresponds to the separation to be made with the light-sensitive sheet 11. This signal is converted into analogue form in a D/A converter 26 and is then used to modulate the light source in the exposing head 21.

Figure 2:
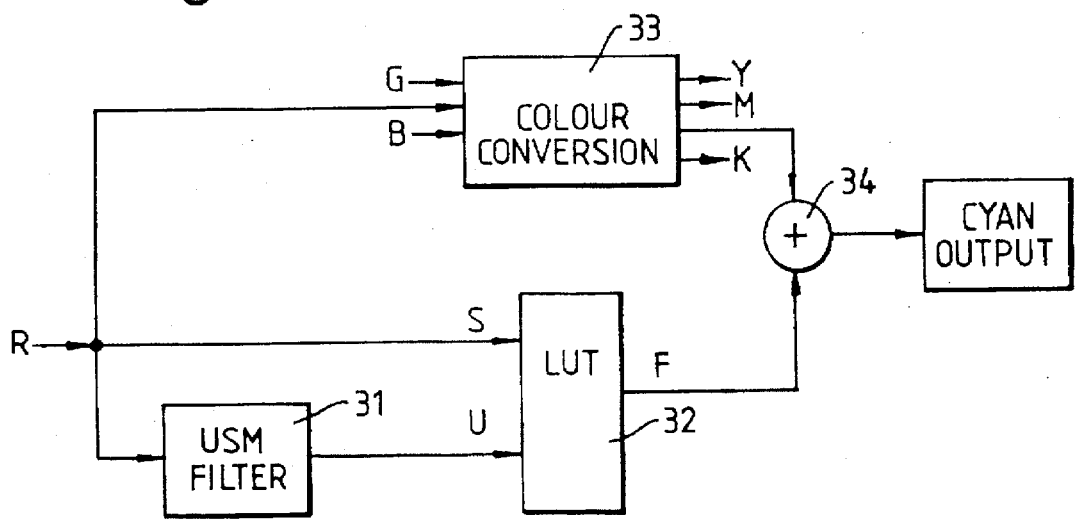
FIG. 2 is a block diagram of a conventional USM/colour correction circuit.

The enhancement unit 24 in a conventional apparatus is partly shown in FIG. 2. Equivalent circuits are provided for producing magenta and yellow outputs from green and blue density input signals respectively. The signal R representing the red density of a scanned element of the picture 1 is input in parallel to a USM filter 31 (the output of which is the unsharp signal U), a LUT 32 (as the sharp signal S) and a colour conversion circuit 33. In the LUT 32 the unsharp masking algorithm is applied to the sharp and unsharp inputs, S and U. Typically, the unsharp masking is performed by a convolution process as described above, in the USM filter 31.

In its simplest form, the unsharp masking algorithm applied by each fringe generator LUT 32 may be defined as follows:

$$F = k(S-U)$$

where k is the slope of the fringe signal F as a linear function of the difference between the sharp signal S and unsharp signal U.

Figure 3:
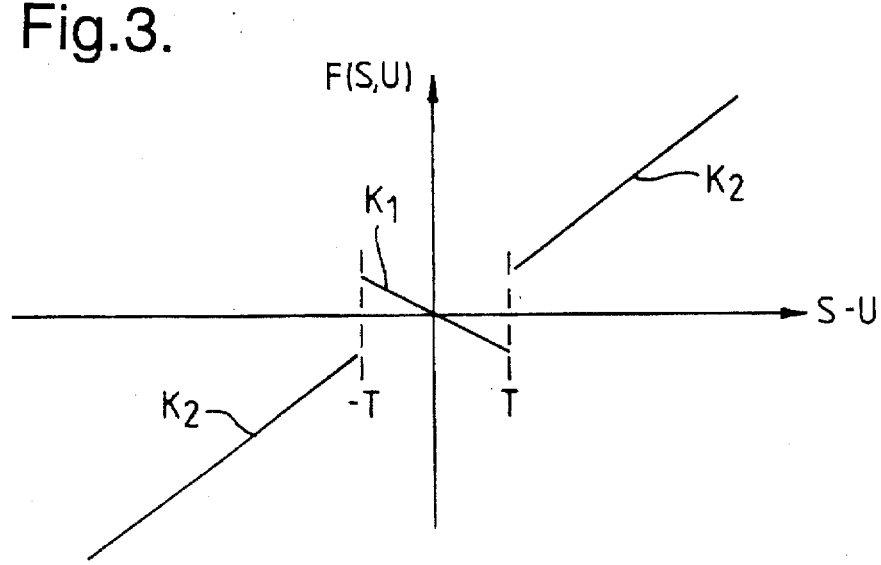
FIG. 3 is a graph of a typical fringe function for use in a method according to the present invention.

In practice it is common to refine the function by applying a threshold function to the difference signal S-U, which represents the localised contrast gradient, in order to allow different degrees of enhancement for small and large contrast changes:

$$F = \begin{cases} k_1(S-U) & \text{when } |S-U| < T \\ k_2(S-U) & \text{when } |S-U| >= T \end{cases}$$

where $k_1, k_2$ are two slopes for the fringe function and T is a threshold value of the difference signal S-U FIG. 3 shows a typical fringe function F(S,U) with negative slope $k_1$ for signal excursions less than the threshold, resulting in signal smoothing, and positive slope $k_2$ for signal excursions greater than the threshold, resulting in the enhancement of fringes.

The outputs of the colour correction circuit 33 and LUT 32 (fringe signal F) are combined by a mixer 34 and output at 41 for storage or to drive an expose head. Unsharp masking and colour correction may be applied on the fly in a graphic arts scanner as the image is being scanned, or as a post scanning processing operation by a computer on the stored digital image.

The colour conversion circuit 33 typically comprises a look-up table loaded by a colour correction function which is a composite of all the factors which influence the colour gamut as described above, signals representing the green and blue density of the scanned element of the picture 1 are input to the colour correction circuit 33 as well as the signals for the red density.

Figure 4:
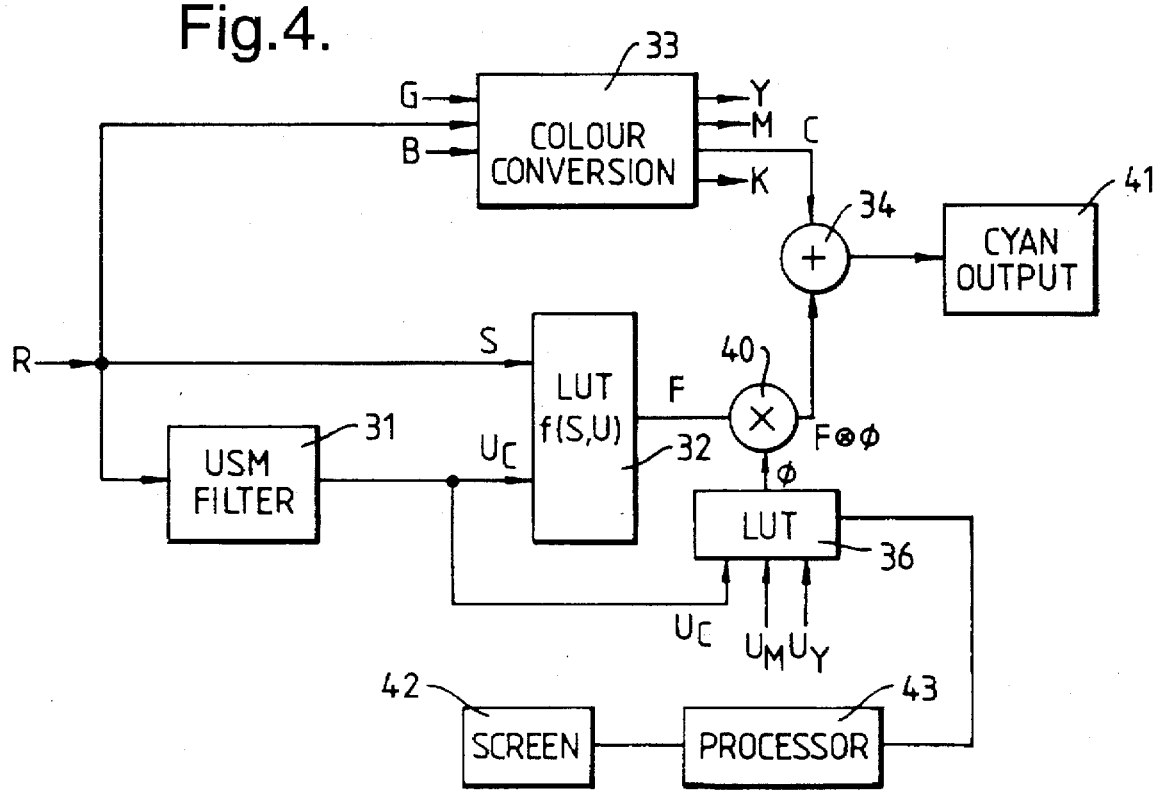
FIG. 4 is a block diagram of apparatus for carrying out the method of the present invention.

By contrast the enhancement unit 24 for use with the present invention is shown in FIG. 4. Again this example is for the red density of the signal from the picture 1. Equivalent circuitry for the green and blue densities is also provided, but not shown.

The red density signal R is input in parallel to the colour conversion circuit 33, the USM filter 31 and the LUT 32. The unsharp signal $U_C$ output from the USM filter 31 is then input in parallel to the LUT 32 and an additional LUT 36. The additional LUT 36 generates a weighting function $\phi$ from the unsharp signal $U_C$ and the other unsharp signals $U_m, U_y$ whilst the LUT 32 applies the unsharp masking algorithm to the sharp and unsharp signals $S, U_C$.

Figure 6:
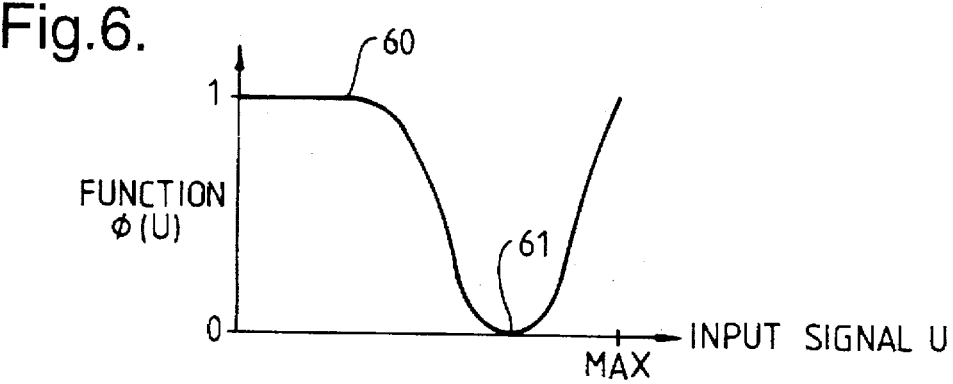
FIG. 6 is a graph of a weighting function.
Figure 7:
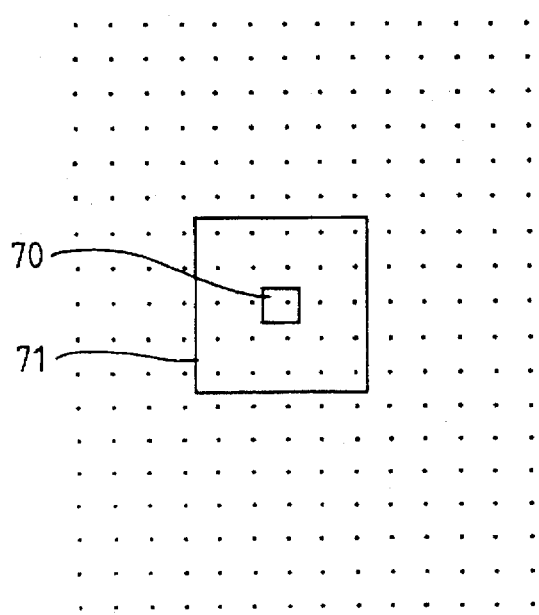
FIG. 7 illustrates how an unsharp and sharp image is obtained.

The output of the LUT 32 is modified by the weighting function $\phi$ from the LUT 36 by multiplier 40 so that the application of the fringe function of FIG. 3 is dependent on the colour of the pixels of the part of the picture 1 to which it is applied. FIG. 6 shows an example of a suitable weighting function $\phi$ (U). The weighting function should be a mathematically continuous, smoothly changing function of the three input signals. This example results in full fringe at 60, and no fringe at 61. Various methods of generating such functions are possible as used in the generation of colour selected spatial masks for image retouching purposes. An example of such functions in three-dimensions is described in EP-A-0441558. The corrected signal value from mixer 34 may then be output to a printer.

Figure 5:
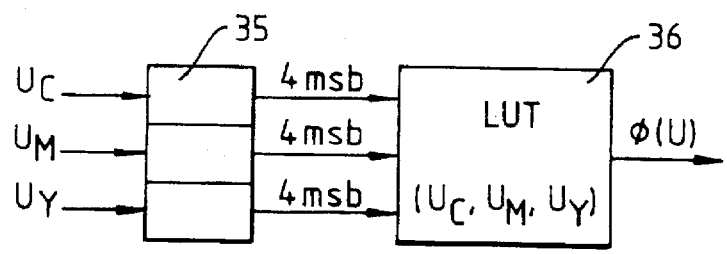
FIG. 5 is a block diagram of the circuitry for generating a weighting function.

In FIG. 5 an example of the circuitry for generating the weighting function $\phi$ ($U_C, U_M, U_Y$) is shown in more detail. Individual unsharp signals U for cyan, magenta and yellow respectively are input to a splitter 35 where the least significant bits can be discarded to reduce the memory requirements of the LUT 36 and hence reduce the set-up time. Next, these signals are input to the LUT 36 where the weighting function $\phi$ (U) is generated.

The preferred option of taking the four most significant bits of each of the three input signals results in a 12-bit address to the LUT 36 containing 4096 entries.

Figure 9:
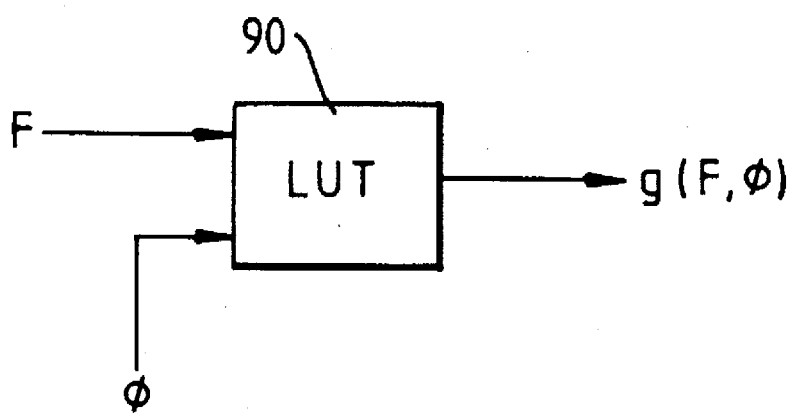
FIG. 9 shows a more general form of the generator for the weighting function.

The fringe weighting function $\phi$ could also be generated from the original pixel data or from the sharp signals $S_R, S_G, S_B$, though the preferred option is to use the unsharp signals as shown in FIGS. 4 and 5, because it increases the resistance to noise in the pixel data of the original image. A more general form of the generator for the weighting function is shown in FIG. 9. Instead of the multiplier 40 the fringe signal F and the weighting signal $\phi$ are input to the LUT 90, which produces the weighted fringe signal for input to mixer 34. The LUT 90 can be pre-loaded with any suitable composition function of the two inputs. The mixer 34 could likewise be replaced by a LUT.

In practice the operator of the equipment trains the weighting function by pointing to the regions of the image to be smoothed and sharpened respectively on a touch sensitive screen 42 (or by some other input device). A processor 43 then samples the pixels in each area to determine the average colour, and sets up the function in the lookup-table 36 accordingly.

It should be understood that the invention applies not only to conventional drum scanners as described but also to other types of scanners, such as those using CCD arrays, and to video cameras, in fact to any type of real time image acquisition and conditioning device or process and to any kind of post-scan image processing operation.

We claim:

1. A method of modifying a colour image defined by pixel data representing a colour component content of each pixel of said colour image, the method comprising, for each colour component of each pixel, the following steps:

(a) generating unsharp and sharp data and performing an unsharp masking algorithm on said sharp and unsharp data to generate fringe data;

(b) modifying said fringe data with a variable weighting function, the variable weighting function being determined in accordance with values of said sharp or unsharp data for each said colour component of said pixel, to obtain modified fringe data;

(c) combining said modified fringe data with said pixel data to generate modified pixel data; and (d) modifying said colour image in accordance with said steps (a)–(c) to produce a modified colour image.

2. Apparatus for modifying a colour image defined by pixel data representing a colour component of each pixel of said colour image, the apparatus comprising generating means to generate unsharp and sharp data for each colour component of each pixel; processing means to perform an unsharp masking algorithm on said unsharp and sharp data to generate fringe data, means to modify said fringe data with a variable weighting function, the variable function being determined in accordance with values of said sharp or unsharp data for each said colour component of the pixel, to obtain modified fringe data; means for combining said modified fringe data with said pixel data to generate modified pixel data; and means, responsive to said means for combining, for modifying said colour image to produce a modified colour image.

3. A method according to claim 1, wherein said weighting function is determined by choosing selected areas of said image having different required degrees of modification, and calculating said weighting function in accordance with an average colour and required degree of modification of each of said selected areas.

4. A method according to claim 1, wherein said weighting function is a mathematically continuous function in a coordinate space defined by said unsharp data.

5. A method according to claim 1, further comprising applying colour correction to said pixel data, wherein said pixel data in step (c) is colour corrected pixel data.

6. Apparatus for modifying a colour image defined by pixel data representing a colour component content of each pixel of said colour image, the apparatus comprising generating means to generate unsharp and sharp data for each colour component of each pixel; processing means to perform an unsharp masking algorithm on said unsharp and sharp data to generate fringe data, means to modify said fringe data with a predetermined weighting function, the weighting function being determined in accordance with values of said sharp or unsharp data for each said colour component of the pixel, to obtain modified fringe data; and means for combining said modified fringe data with said pixel data to generate modified pixel data.

7. Apparatus according to claim 6, wherein the generating means generates said unsharp data by calculating a weighted average of pixel data in a region surrounding said pixel.

8. Apparatus according to claim 6, comprising means to choose selected areas of said image having different required degrees of modification, and means of calculating said predetermined weighting function in accordance with an average colour and required degree of modification of each of said selected areas.

9. Apparatus according to of claim 6, wherein said weighting function is a mathematically continuous function in a coordinate space defined by the unsharp colour data.

10. Apparatus according to claim 6, further comprising a colour converter to apply colour correction to said pixel data to obtain colour corrected pixel data, wherein said colour corrected pixel data is combined with said modified fringe data.

* * * * *